United States Patent [19]

Fukuhara

[11] 4,260,233

[45] Apr. 7, 1981

[54] DIAPHRAGM MECHANISM OF A PHOTOGRAPHIC LENS

[75] Inventor: Toru Fukuhara, Isehara, Japan

[73] Assignee: Nippon Kogaku K.K., Tokyo, Japan

[21] Appl. No.: 70,982

[22] Filed: Aug. 30, 1979

[30] Foreign Application Priority Data

Sep. 7, 1978 [JP] Japan ............................ 53/122124[U]

[51] Int. Cl.³ .............................................. G03B 9/06
[52] U.S. Cl. .................................................... 354/274
[58] Field of Search ............................... 354/270–274, 354/40, 46, 47

[56] References Cited

U.S. PATENT DOCUMENTS

| | | | |
|---|---|---|---|
| 2,949,837 | 8/1960 | Baab | 354/274 |
| 3,442,194 | 5/1969 | Sho | 354/274 X |
| 3,631,787 | 7/1972 | Shimizu | 354/274 |

Primary Examiner—John Gonzales
Attorney, Agent, or Firm—Fitzpatrick, Cella, Harper & Scinto

[57] ABSTRACT

A diaphragm mechanism of a photographic lens comprises a plurality of diaphragm blades defining an aperture opening, a stop-down lever, transmission means for transmitting the movement of the stop-down lever to the diaphragm blades to displace them and determine the aperture opening, and cam means for controlling the amount of displacement of the diaphragm blades for the amount of movement of the stop-down lever.

7 Claims, 5 Drawing Figures

DIAPHRAGM MECHANISM OF A PHOTOGRAPHIC LENS

BACKGROUND OF THE INVENTION

1. Field of the Invention

This invention relates to a diaphragm mechanism of a photographic lens.

2. Description of the Prior Art

The diaphragm mechanism of the conventional photographic lens has a plurality of diaphragm blades, a fixing member for supporting them, a diaphragm blade driving plate for driving the diaphragm blades, and a stop-down lever integrally attached with the diaphragm blade driving plate. A pin projected on one side of each diaphragm blade is rotatably supported by the fixing member and a pin projected on the other side of each diaphragm blade is fitted in a straight groove formed in the diaphragm blade driving plate. With the movement of the stop-down lever, the diaphragm blade driving plate is rotated to displace the diaphragm blades and control the aperture diameter.

In this case, for example, when the aperture is stopped down from the fully open aperture diameter to the minimum aperture diameter, the aperture diameter is decreased by $1/\sqrt{2}$ times each time the number of aperture states is varied by one stage (for example, from F1.4 to F2). In the converse case, as the aperture approaches the fully open aperture diameter, the aperture diameter is increased by $\sqrt{2}$ times for a variation of one stage. That is, the aperture diameter is varied in the manner of a geometric progression. In accordance with this, the stroke of the stop-down lever is also varied in the manner of a geometric progression. In the stroke characteristic of the stop-down lever of FIG. 1 wherein the abscissa represents the stroke of the stop-down lever going from the fully open aperture toward the minimum aperture and the ordinate represents the number of aperture stages, the conventional diaphragm mechanism is represented by a curve (A). In the conventional construction, when the aperture control is effected by the stop-down lever, the more the aperture is stopped down, the smaller is the stroke of the stop-down lever required for the variation of the same number of aperture stages and therefore, the smaller is the aperture opening, the worse is the control accuracy of the aperture diameter.

Now, a diaphragm mechanism is known in which the diaphragm blade driving plate is provided with a cam to vary the stroke of the stop-down lever in the manner of an arithmetic progression for a variation of one aperture stage as indicated by a line (B) in FIG. 1. With this construction, however, the amount of rotation of the diaphragm blades is great particularly in the vicinity of the fully open aperture and therefore, in the vicinity of the first stage, namely, in the vicinity of the fully open aperture diameter, the efficiency of the cam becomes worse due to the friction loss of the cam surface and the rising speed of the stop-down becomes slower to aggravate the follow-up characteristic of the aperture with respect to the movement of the stop-down lever or to increase the time required to stop down the aperture to a required aperture value. Accordingly, if an objective lens provided with such a diaphragm mechanism is used with a camera in which the aperture diameter is automatically controlled in accordance with the brightness of an object, there is a disadvantage that the time required for the aperture control is increased.

SUMMARY OF THE INVENTION

The object of the present invention is to provide a diaphragm mechanism of a photographic lens which is constructed so that in the vicinity of the first stage of stop-down, the stop-down lever is varied in the manner of a geometric progression for a variation in the aperture stage and thereafter the stop-down lever is varied in the manner of an arithmetic progression when the aperture is stopped down beyond the first stage.

The invention will become fully apparent from the following detailed description of some embodiments thereof taken in conjunction with the accompanying drawings.

DESCRIPTION OF THE PREFERRED EMBODIMENTS

Figure 1:
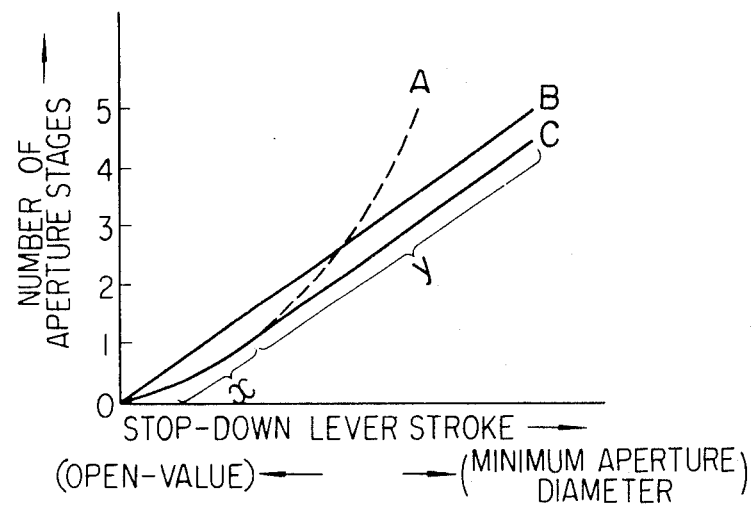
FIG. 1 is a graph illustrating the stroke characteristic curves of a stop-down lever.
Figure 2:
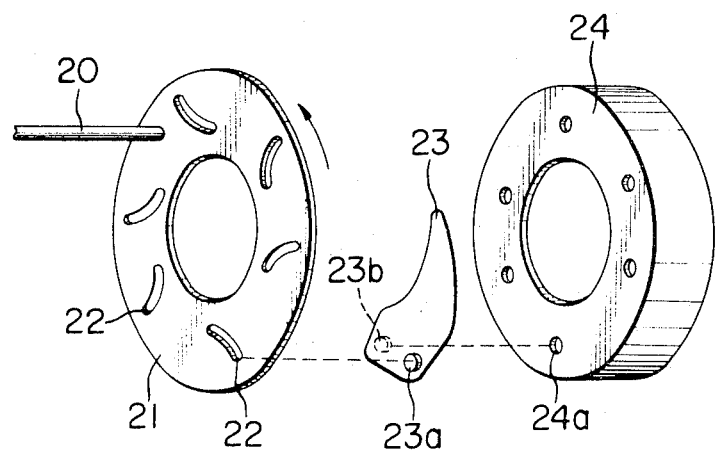
FIG. 2 is a perspective view of a first embodiment of the present invention.

Referring to FIG. 2, a stop-down lever 20 is secured to a diaphragm blade driving plate 21. The diaphragm blade driving plate 21 is provided with the same number (six in the present embodiment) of curved cam grooves 22 as diaphragm blades 23 which will later be described. The cam grooves 22 are equidistantly disposed on the circumference of the diaphragm blade driving plate 21. Six diaphragm blades are necessary in this diaphragm mechanism, but in FIG. 2, only one of them, 23, is shown for the sake of simplicity. The diaphragm blade 23 has a pin 23a on one side thereof and a pin 23b on the opposite side thereof. The pin 23a is fitted in the corresponding cam groove 22 and the pin 23b is rotatably supported in a corresponding hole 24a formed in a fixing ring 24 which is a support member. The configuration of the cam groove 22 is determined so that the characteristic of the relationship between the amount of rotation, namely, the stroke, of the stop-down lever 20 and a variation in the number of aperture stages becomes as indicated by solid line (C) in FIG. 1. This curve (C) is determined such that in the area x near the first stage of the stop-down (herein, the first stage means the aperture stopped down from the fully open aperture by one stage.) the stop-down lever is displaced in the manner of a geometric progression for a variation in the number of aperture stages and that in the entire subsequent area y the stop-down lever is displaced in the manner of an arithmetic progression for a variation in the number of aperture stages and that the stop-down lever 20 is also smoothly displaced also in the boundary between the area x near the first stage and the subsequent area y. Thus, the curve (C) is such that the characteristic curve of the area y is contiguous with the characteristic curve of the area x at the boundary between the areas y and x. This boundary between the areas y and x is desired to be 0.5 to 1.5 aperture stages. In FIG. 1, the boundary point is set such that the stroke of the stop-down lever is near one stage. Therefore, for example, in an objective lens having a fully open F-value of F1.4, the stop-down lever 20 is displaced in the manner of a geometric progression from F1.4 to F2, and displaced in the manner of arithmetic progression from F2.

With such a construction, when the stop-down lever 20 is moved by a signal from a camera body, not shown, the diaphragm blade driving plate 21 is rotatively driven thereby in the direction of the arrow so that the diaphragm blade 23 is displaced according to the configuration of the cam groove 22 so as to satisfy the line (C), thus varying the aperture diameter.

Figure 3:
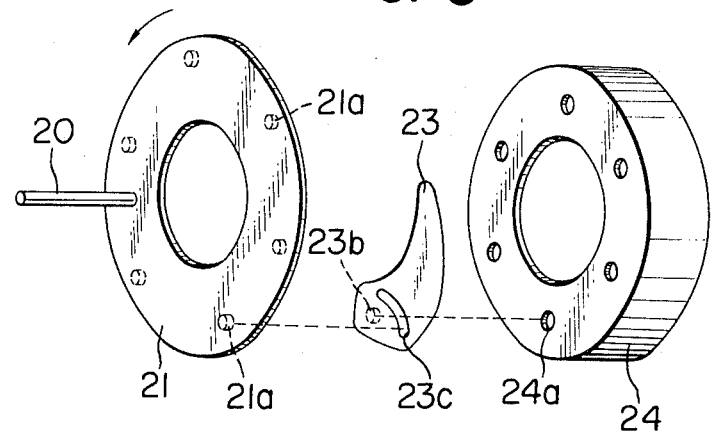
FIGS. 3, 4, and 5 are perspective views showing a second, a third and a fourth embodiment of the present invention, respectively.

A second embodiment will now be described. In FIG. 3, a curved cam groove 23c which imparts the characteristic as shown by the solid line (C) of FIG. 1 to the diaphragm mechanism is formed in the diaphragm blade 23. A pin 21a fitted in this cam groove 23c is secured to the diaphragm blade driving plate 21. In the other points, the second embodiment is similar to the embodiment of FIG. 2.

The cam grooves 23c and the holes 24a may be replaced by each other. That is, cam grooves such as the cam grooves 23c, instead of the hole 24a, may be formed in the fixing ring 24, and holes such as the holes 24a, instead of the cam grooves 23c, may be formed in the diaphragm blades 23.

Figure 4:
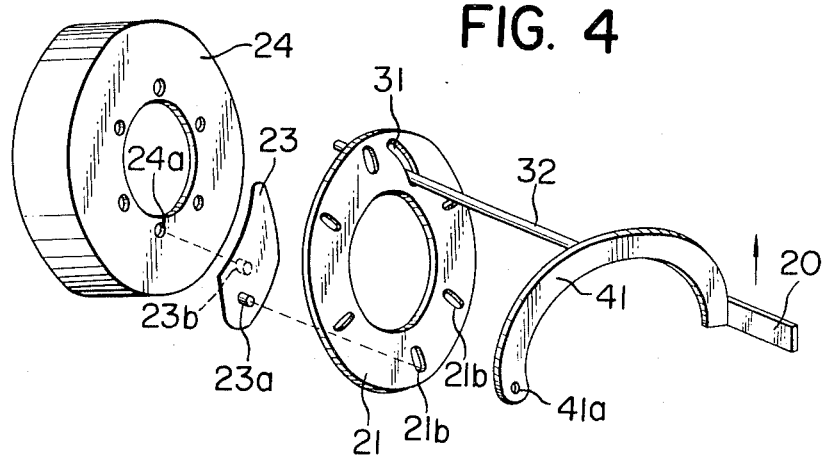

FIG. 4 shows a third embodiment of the present invention. In FIG. 4, a number of straight grooves 21b equal to the number (six in the present embodiment) of diaphragm blades are formed in a diaphragm blade driving plate 21, and a cam groove 31 is formed in the plate 21 at any desired position between two straight grooves 21b. A stop-down lever 20 is secured to an intermediate member 41 which is rotatably supported at one end 41a, and a connecting rod 32 has one end secured to the intermediate member 41. The other end of the rod 32 is inserted in the curved cam groove 31 of the diaphragm blade driving plate 21. The pin 23a of a diaphragm blade 23 is fitted into a corresponding straight groove 21 of the driving plate 21, and the pin 23b of the diaphragm blade 23 is supported in a corresponding hole 24a of a fixing ring 24. The configuration of the cam groove 31 is determined so that the stroke of a stop-down lever 20 and the characteristic of a variation in the number of aperture stages become as indicated by the solid line (C) in FIG. 1 and therefore, when the stop-down lever 20 is moved in the direction of the arrow, the diaphragm blade 23 is displaced according to the configuration of the cam groove 31, to thereby vary the aperture diameter to the set aperture value.

Figure 5:
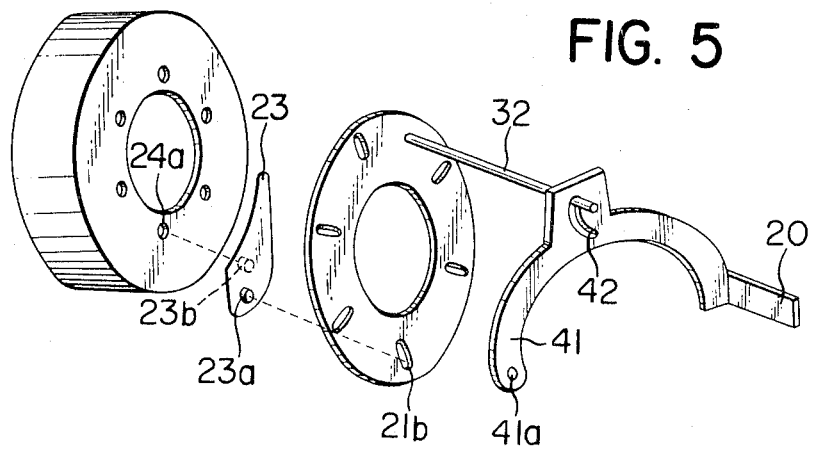

FIG. 5 shows a fourth embodiment of the present invention. This embodiment differs from the third embodiment in that a curved cam groove 42 is formed in the center of the intermediate member 41 and that one end of the rod 32 is fitted in the cam groove 42 while the other end of the rod is secured to the diaphragm blade driving plate 21. The constructions of the diaphragm blade 23, the diaphragm blade driving plate 21 and the fixing ring 24 are similar to those of FIG. 4. The configuration of the cam groove 42 is determined so that the stroke characteristic of the stop-down lever 20 becomes as indicated by the solid line (C) in FIG. 1. The operation for varying the aperture diameter is identical to that described in connection with FIG. 4.

According to the present invention of the above-described construction, the stroke of the stop-down lever near the fully open aperture is great, whereby it is possible to enhance the efficiency of the cam and quicken the rising speed of the stop-down and shorten the stop-down time. This leads to an advantage that the time required for the automatic aperture control in the case of automatic exposure control can be shortened.

I claim:

1. A diaphragm mechanism of a photographic lens comprising:
   (a) a plurality of diaphragm blades defining an aperture opening;
   (b) a stop-down lever;
   (c) transmission means for transmitting the movement of said stop-down lever to said diaphragm blades to displace them and determine the aperture opening; and
   (d) cam means for controlling the amount of displacement of said diaphragm blades for the amount of movement of said stop-down lever so that in the initial stop-down area from the fully open aperture diameter to an aperture diameter stopped down by approximately one stage, the number of aperture stages is varied in the manner of an arithmetic progression when the amount of movement of said stop-down lever is varied in the manner of a geometric progression and that outside said initial stop-down area, the number of aperture stages is also varied in the manner of an arithmetic progression when the amount of movement of said stop-down lever is varied in the manner of an arithmetic progression.

2. A diaphragm mechanism according to claim 1, wherein said cam means is a curved cam groove and said initial stop-down area is 0.5 to 1.5 aperture stage from the fully open aperture diameter.

3. A diaphragm mechanism according to claim 2, wherein said cam means is provided in said transmission means.

4. A diaphragm mechanism according to claim 3, wherein said transmission means has a diaphragm blade driving plate rotated by said stop-down lever, said driving plate has a plurality of curved cam grooves acting as said cam means, said cam grooves are equidistantly disposed on a circumference, the number of said cam grooves is equal to that of said diaphragm blades, and each of said diaphragm blades has a projection fitted in corresponding one of said cam grooves.

5. A diaphragm mechanism according to claim 3, wherein said transmission means has a diaphragm blade driving plate rotatable by said stop-down lever and displacing said diaphragm blades in accordance with the amount of rotation thereof, and a connecting rod secured to said stop-down lever, said diaphragm blade driving plate has a curved cam groove acting as said cam means, and said connecting rod is fitted in said cam groove.

6. A diaphragm mechanism according to claim 3, wherein said transmission means has a diaphragm blade driving plate rotatable by said stop-down lever and displacing said diaphragm blades in accordance with the amount of rotation thereof, and an intermediate member for transmitting the movement of said stop-down lever to said diaphragm blade driving plate, and said intermediate member is provided with a curved cam groove acting as said cam means.

7. A diaphragm mechanism according to claim 2, wherein each of said diaphragm blades has a curved cam groove acting as said cam means, and said transmission means transmitting the movement of said stop-down lever to said diaphragm blades through said cam groove.

* * * * *